US006211309B1

(12) United States Patent
McIntosh et al.

(10) Patent No.: US 6,211,309 B1
(45) Date of Patent: Apr. 3, 2001

(54) WATER-DISPERSABLE MATERIALS

(75) Inventors: Stanley A. McIntosh; Harold R. Vickery, both of Candler, NC (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 09/106,118

(22) Filed: Jun. 29, 1998

(51) Int. Cl.$^7$ .................. C08F 283/00; C08C 75/00; C08L 81/00; C08G 63/91; C08G 69/48
(52) U.S. Cl. .................. 525/535; 525/63; 525/66; 525/67; 525/69; 525/419; 525/420; 525/425; 525/432; 525/444; 525/452; 525/454
(58) Field of Search .................. 525/66, 67, 63, 525/69, 444, 420, 419, 425, 432, 452, 454, 535

(56) References Cited

U.S. PATENT DOCUMENTS

| | | |
|---|---|---|
| 3,546,180 | 12/1970 | Caldwell et al. . |
| 3,734,874 | 5/1973 | Kibler et al. . |
| 3,846,507 | 11/1974 | Thomm et al. . |
| 4,304,901 | 12/1981 | O'Neill et al. . |

FOREIGN PATENT DOCUMENTS 0 585 906    3/1994   (EP) .

*Primary Examiner*—Patrick D. Niland
(74) *Attorney, Agent, or Firm*—Nixon & Vanderhye P.C.

(57) ABSTRACT

The present invention relates to water-dispersible materials (e.g. fibers or films) and to a method of producing same. The materials of the invention comprise a water soluble component, for example, a sulfonated polycondensate thermoplastic, and a modifying auxiliary component, for example, a low melt temperature thermoplastic.

13 Claims, No Drawings

WATER-DISPERSABLE MATERIALS

TECHNICAL FIELD

The present invention relates to water-dispersible materials (e.g. fibers or films) and to a method of producing same. The materials of the invention comprise a water soluble component, for example, a sulfonated polycondensate thermoplastic, and a modifying auxiliary component, for example, a low melt temperature thermoplastic.

BACKGROUND

Water dispersible thermoplastic materials currently available generally comprise sulfonated polymers (see U.S. Pat. Nos. 3,734,874, 3,546,180 and 4,304,901). Sulfonation increases the degree of ionic character of a polymer and thus the water solubility, but leaves the polymer brittle. Extrusion of sulfonated polymers is possible, however, the resulting threadline cannot withstand winding.

The present invention overcomes problems of water dispersible polymers of the art by providing a polymer that is both water soluble and sufficiently flexible to permit winding.

OBJECTS AND SUMMARY OF THE INVENTION

It is a general object of the present invention to provide a flexible, water dispersible material (e.g. fiber or film).

In accordance with that objective, the present invention relates to a water-dispersible material comprising two different polymers, a first of the polymers being a water soluble thermoplastic polymer and a second of the polymers being a modifying auxiliary comprising a low melt temperature thermoplastic.

Further objects and advantages of the invention will be clear from the description that follows.

DETAILED DESCRIPTION OF THE INVENTION

The present invention relates to a water-dispersible thermoplastic material that is sufficiently flexible when extruded to permit winding and packing of the resulting threadline. Fibers of the invention are prepared by co-extruding a water soluble thermoplastic polymer with a modifying auxiliary polymer. The auxiliary polymer is sufficiently miscible with the water soluble thermoplastic polymer to enhance the flexibility of the latter. While the present fibers readily disperse in water, they are sufficiently stable to permit the use of an aqueous finish during processing and to be resistant to environmental humidity.

A preferred composition of a blend suitable for use in the preparation of materials of the invention comprises, as the water soluble component, a sulfonated polycondensate thermoplastic and, as the modifying auxiliary component, a low melt temperature (e.g. <150° C.) polycondensate thermoplastic. Additional water soluble and insoluble components can be included to tailor flexibility (e.g. blends of materials described herein).

Sulfonated polycondensate thermoplastics suitable for use as the water soluble component of the present blend include water-dissipatable thermoplastic polyesters, polyester amides, polyamides and urethanes.

Suitable polyesters are described in EPO 0 585 906 A2 (Herring) and include Eastman LB-100. BASF Schlichte EB-307 can also be used. Suitable polyester amides include polymers having a blend of amide and ester linkages in the polymer chain and sufficient water solubilizing functionality (e.g., sulfonate, polyethylene oxide, carboxylate or quaternary ammonium) to impart water solubility. Suitable polyamides include those described in U.S. Pat. No. 3,846,507, such as Ultramid C-68.

Suitable urethanes include urethane polymers that have sufficient water solubilizing functionality (sulfonate, polyethylene oxide, carboxylate or quaternary ammonium) to impart water solubility.

When polyesters are used as the water soluble component, the modifying auxiliary is, advantageously, a polyester such as a polycaprolactone. Suitable polycaprolactones include Interox CAPA 650, and polycaprolactone polymers from Union Carbide Corporation, including Tone P-767 and P-303. Tone Polyol 0201 and CAPA 203 can also be used.

When polyester amides are used as the water soluble component, the modifying auxiliary is, advantageously, either a polyamide or a polyester.

When polyamides are used as the water soluble component, suitable modifying auxiliary polymers include polyamides, such as ethylene diamine-based polyamides including Shell Chemical Azamides 1930 and 1940, Hüls' Vestamelt polyamides, modified nylon-12, ELF Atochel Platamid nylon terpolymers, and other low melt temperature polyamides.

When urethanes are used as the water soluble component, suitable modifying auxiliary polymers include polymers capable of plasticizing the water soluble polymer sufficiently to allow for filament flexibility (this is, in fact, the basic function served by, for example, the polycaprolactone and Vestamelt referenced above).

The blends of the present invention are formulated so as to ensure adequate solubility and flexibility. For example, ratios of water soluble polymer to modifying auxiliary can be in the range of 1:20 to 20:1, 4:1 being preferred.

The blends of the invention can be prepared and extruded using a variety of techniques. For example, when blend components are solids at room temperature they can be dry blended from chips or powders. The resulting dry blend can then be loaded into an extruder throat. When one of the blend components is a liquid at room temperature, a compound extruder can be used to effect mixing (e.g. the solid chip or powder can be loaded into the extruder hopper and the liquid added downstream). Vented compound extrusion can also be used to effect blend preparation. Using this approach, the solid modifying polymer component can be loaded into the extruder hopper and a water-based solution of the water soluble component injected downstream. A vacuum port allows removal of the water before the polymer emerges from the die head. Blends of the invention can also be prepared using hot-melt reactors.

Processing of blends can be carried out using a variety of methods. Although conventional extrusion is preferred, blends can also be pumped from a melt vessel directly into a spin pack. Threadlines can be spun, for example, at draw ratios from 1:1 to 1:4, 1.26:1 being preferred.

The materials of the invention can be used in disposable packaging, transient and flexible coatings and removable binders. As a specific example, fiber or film bags made of the blend of the present invention can be used to package additives for water-based systems. Upon addition of the bag to the system, dissolution of the package occurs with release of the contents (i.e. the additive) into the system. In another specific example, fibers fabricated in accordance with the present invention can be used as temporary supports for various types of stitch work (e.g. embroidery). Once the stitch work is completed, the resulting article can be exposed to water and the support thereby dispersed away.

Certain aspects of the present invention are described in greater detail in the Example that follows.

EXAMPLE

Polymers were prepared from hand-tumbled chip blends of: (i) Eastman LB-100 (75%) and Interox CAPA 650 (25%) (Yarn 1), and (ii) Eastman LB-100 (75%) and Hüls' Vestamelt 722 (25%) (Yarn 2) The blended components were fed into a spinerette using a 1 inch screw extruder. The yarn extrusion conditions were as follows:

| Spinnerette: | 200 micron capillary diameter |
| --- | --- |
| | 14 filament |
| | round cross-section. |
| Minispin 2: Zone 1: | 170° C. |
| Zone 2: | 180° C. |
| Zone 3: | 180° C. |
| Polymer: | 220° C. |
| Throughput: | 30 grams/minute |
| Spin/Draw: | 1.6:1 |
| Winding: | 230 meters/minute |
| NF-002 applied at 1% finish. | |

The resulting yarn properties were as follows:

| | Yarn 1 | Yarn 2 |
| --- | --- | --- |
| Denier | 1092 | 1107 |
| Average elongation | 3.00% | 13.30% |
| Elongation std. dev. | 0.30% | 1.80% |
| Average breaking load | 121.24 grams | 100.81 grams |
| Load std. Dev. | 10.72 grams | 2.88 grams |
| Average tenacity | 0.11 | 0.09 |
| AVG_work to break | 2.17 | 11.20 |

* * *

All documents cited above are hereby incorporated in their entirety by reference.

One skilled in the art will appreciate from a reading of this disclosure that various changes in form and detail can be made without departing from the true scope of the invention.

What is claimed is:

1. A fiber-spinnable and windable, water-dispersible material consisting essentially of a blend of (1) a first polymer which is a sulfonated, water-dissipatable thermoplastic polymer selected from the group consisting of polyesters, polyester amides, and urethanes, and (2) a second polymer which is a water insoluble modifying auxiliary thermoplastic polymer having a melting point of less than about 150° C. in an amount sufficient to plasticize the sulfonated, water-dissipatable thermoplastic polymer and thereby impart fiber spinnability and windability thereto.

2. The material according to claim 1, wherein the ratio of said first polymer to said second polymer is in the range of 1:20 to 20:1.

3. The material according to claim 1 wherein said first polymer is a polyester.

4. The material according to claim 1 wherein said second polymer is a polycondensate thermoplastic.

5. The material according to claim 1, wherein said second polymer is a polyester or a polyamide.

6. The material according to claim 5, wherein said second polymer is a polyester.

7. The material according to claim 5, wherein said second polymer is a polyamide.

8. The material according to claim 6 wherein said polyester is a polycaprolactone.

9. The material according to claim 7 wherein said polyamide is an ethylene diamine-based polyamide.

10. A water dispersible material comprising two different polymers, wherein said first polymer is a water-dissipatable polyester and said second polymer is a polyester having a melting point of less than about 150° C.

11. The material according to claim 10 wherein said first polymer is a sulfonated polyester.

12. The material according to claim 10 wherein said second polymer is a polycaprolactone.

13. A fiber spun from the material according to claim 1.

* * * * *